US007088886B2

(12) United States Patent
Mangir et al.

(10) Patent No.: US 7,088,886 B2
(45) Date of Patent: Aug. 8, 2006

(54) SELF-ADAPTING LIMITER

(75) Inventors: Metin S. Mangir, Santa Monica, CA (US); Daniel Yap, Newbury Park, CA (US); Willie W. Ng, Agoura Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 243 days.

(21) Appl. No.: 10/714,494

(22) Filed: Nov. 13, 2003

(65) Prior Publication Data

US 2004/0136649 A1 Jul. 15, 2004

Related U.S. Application Data

(60) Provisional application No. 60/426,732, filed on Nov. 15, 2002.

(51) Int. Cl.
*G02B 6/26* (2006.01)
*G02B 6/42* (2006.01)

(52) U.S. Cl. ...................... 385/27; 359/341.4
(58) Field of Classification Search ............... 359/334, 359/341.4, 341.1; 385/15, 27; 250/227.11
See application file for complete search history.

(56) References Cited

U.S. PATENT DOCUMENTS

| 4,780,876 | A | * | 10/1988 | Smith et al. ................ 372/3 |
| H1791 | H | | 3/1999 | Williams ................ 385/140 |
| 5,917,179 | A | * | 6/1999 | Yao ................ 250/227.11 |
| 6,178,036 | B1 | | 1/2001 | Yao ................ 359/334 |
| 6,449,408 | B1 | * | 9/2002 | Evans et al. ................ 385/27 |
| 6,621,619 | B1 | * | 9/2003 | Strutz et al. ................ 359/334 |
| 2002/0145794 | A1 | | 10/2002 | Pedersen ................ 359/337 |

FOREIGN PATENT DOCUMENTS

WO 01/35539 A2 5/2001

OTHER PUBLICATIONS

Agrawal, G.P., "Stimulated Brillouin Scattering," *Nonlinear Fiber Optics*, Academic Press, pp. 370-398 (1995).
Cotter, D., "Observation of Stimulated Brillouin Scattering in Low Loss Silica Fibre at 1.3 μm," *Electronics Letters*, vol. 18, No. 12, pp. 495-496 (Jun. 10, 1982).
Lee, C.C., et al., "Measurement of Stimulated-Brillouin-Scattering Threshold for Various Types of Fibers Using Brillouin Optical-Time-Domain Reflectometer," *IEEE Photonics Technology Letters*, vol. 12, No. 6, p. 672-674 (Jun. 2000).
Williams, K.J., et al., "Stimulated Brillouin Scattering for Improvement of Microwave Fibre-Optic Link Efficiency," *Electronic Letters*, vol. 30, No. 23, pp. 1965-1966 (Nov. 10, 1994).
Yao, X. S., "Brillouin Selective Sideband Amplification of Microwave Photonic Signals," *IEEE Photonics Technology Letters*, vol. 10, No. 1, pp. 138-140 (Jan. 1998).

\* cited by examiner

*Primary Examiner*—Akm Enayet Ullah
*Assistant Examiner*—Daniel Petkovsek
(74) *Attorney, Agent, or Firm*—Ladas & Parry LLP

(57) ABSTRACT

A limiter for limiting selected frequency components by generating Stokes waves in a stimulated Brillouin scattering medium. The generated Stokes waves create a seed that is provided to another stimulated Brillouin scattering medium. The seed selecting the undesired frequency components to be attenuated.

27 Claims, 7 Drawing Sheets

SELF-ADAPTING LIMITER

CROSS REFERENCE TO RELATED APPLICATIONS

This application claims the benefit of U.S. Provisional Patent Application No. 60/426,732, filed Nov. 15, 2002 and entitled "Self-Adapting Limiter" the disclosure of which is hereby incorporated herein by reference.

This application is related to an international patent application entitled "Agile Spread Waveform Generator and Photonic Oscillator" by Daniel Yap and Keyvan Sayyah, filed on Nov. 15, 2002 under the provisions of the Patent Cooperation Treaty (PCT), at the United States Receiving Office, bearing the serial number PCT/US02/36849 (Attorney Docket No. 620376-1), which application designates the United States and other countries, the entire disclosure of which is hereby incorporated herein by reference.

BACKGROUND OF THE INVENTION

1. Field of the Invention

The present invention relates to Stimulated Brillouin Scattering (SBS). More particularly, the present invention relates to using the limited bandwidth of SBS to selectively attenuate certain modulation sidebands of a RF modulated lightwave waveform, while not attenuating other modulation sidebands.

2. Background of the Invention

Many RF receivers such as those used for communication and radar systems are located in complex and densely populated electromagnetic (EM) environments. The signal emitted from one antenna can interfere with the reception of another antenna. For example, commercial receivers located near high-power transmitters such as television or radio stations are subject to substantial interference. The intensity of the interfering signals can be many orders of magnitude higher than the desired signals to be sensed by the receiving system, such as a radar system. The high power in the interfering signal components can saturate the amplifiers in the receiver and thus distort desired signals. They also place greater demands on the dynamic range required of digital receivers and their analog-to- digital convertors.

Present receivers address the problem of interference by using frequency-notch filters and multiple stages of frequency conversion to remove known interference. Also, multiple stages of automatic gain control (AGC) and limiting are used to prevent saturation of the electronics and to extend their linear range to higher input power levels. However, multiple stages of AGC and/or limiting reduce the sensitivity of the sensor. Actual systems might include more than 75 dB of gain reduction, distributed along the entire receive path, with an accompanying degradation of the noise figure. Prior electronic limiters typically are amplifiers whose gains become clamped once the intensity of the composite input signal reaches or exceeds a certain value. That clamping has no frequency selectivity and applies to all frequency components of the input. Thus, desired frequency components are also adversely affected. AGC amplifiers likewise have no frequency selectivity. What is needed is a limiting system and method for selectively attenuating certain frequency components while not attenuating other frequency components.

Stimulated Brillouin Scattering (SBS) has been used to selectively attenuate the optical carrier of an amplitude-modulated RF lightwave signal, see U.S. Statutory Invention Registration H 1,791 entitled "Stimulated Brillouin Scattering For Fiber-Optic Links" published Mar. 2, 1999 and Electronic Letters, vol. 30, no. 23, pp. 1965–1966 (1994) by Williams and Esner, both of which are hereby incorporated herein by reference.

SBS is a known optical effect. When an optical frequency electromagnetic wave causes vibrations (i.e. an acoustic wave) of the density of an optical medium, an optical grating is produced that causes scattering of the electromagnetic wave traveling in the optical medium. In Brillouin scattering, the wavelength of the scattered electromagnetic wave is shifted with respect to that of the original electromagnetic wave due to the Doppler effect from the motion of the acoustic wave. The frequency shift is a maximum in the backward direction and it reduces to zero in the forward direction, which makes SBS a mainly backward directed process. The incident optical frequency is also known as the pump frequency, which gives the Stokes and anti-Stokes components of the scattered radiation.

In U.S. Statutory Invention Registration H 1,791, the threshold for SBS, which typically depends on the length of the optical fiber and the level of the optical power input to the fiber, is set to attenuate just the optical carrier and not attenuate the modulation sidebands or other frequency components. The effect of this selective attenuation is to enhance the modulation depth (the ratio of the modulation sideband to the carrier). The increased modulation depth can improve the performance of the RF-photonic link. H 1,791 makes use of either a long length of optical fiber or a weakly coupled fiber-optic ring resonator as the medium in which the SBS attenuation occurs. The purpose of the ring resonator is to increase the effective length of the SBS medium so that the optical path-length is much longer than the physical length of the optical filter.

In U.S. Pat. No. 6,178,036 to Yao and in *IEEE Photonics Letters*, vol. 10, no. 1, pp. 138–140 (1998), SBS is used to selectively amplify a selected RF-lightwave modulation sideband. An optical pump signal is injected in the reverse direction into the SBS medium. The optical pump signal is offset in frequency by the Stokes shift from the desired modulation sideband. Since the frequency of the desired modulation sideband coincides with the frequency of the Brillouin scattering, the sideband is amplified. The purpose of the selective amplification is to selectively amplify the desired modulation sideband and leave the strong carrier un-amplified. This improves the modulation depth. It also produces a single-sideband modulated signal, which may have benefits of reduced distortion from optical fiber dispersion. Amplitude modulation of a carrier can produce two modulation sidebands, which have the same magnitude of frequency offset from the carrier but are offset by positive and negative values, respectively. In a single-sideband modulated signal, one sideband of this pair is substantially stronger than the other sideband.

The prior art discussed above utilizes the well-known SBS effect to improve the modulation depth of a RF-modulated lightwave signal or to reduce the distortion from optical fiber dispersion.

The method and system disclosed herein exploits the narrow-band power limiting action of SBS to suppress strong interfering signals, while minimally affecting the desired low-power and/or wide bandwidth received signal.

The relatively narrow bandwidth of gain for SBS in optical fibers is used to produce a peak-power limiter for undesired RF and RF-lightwave signals. The RF signals are amplitude modulated onto a lightwave carrier to create modulation sidebands. The limiter selectively attenuates those modulation sidebands that are stronger than a threshold level.

Thus, only strong frequency components are limited and the weaker frequency components become enhanced, in comparison. The advantage of the SBS approach to limiting is that it is passive, it self-selects the frequencies attenuated, and it affects only a narrow band at each attenuation notch. The SBS only affects a narrow band at each attenuation notch because the spontaneous bandwidth of the SBS effect in an optical fiber is typically smaller than 100 MHz. The system and method disclosed makes use of the relatively small bandwidth of the SBS effect to distinguish between the different modulation sidebands, which are spaced farther apart than the SBS gain bandwidth. Such frequency selective limiting is not normally achievable with electronic limiters. In addition, the disclosed system and method seeds the Stokes-shifted light into the main SBS medium (in the reverse direction) so that the length of that main SBS medium can be reduced. This seed is preferably generated in a separate ring or strand of fiber from the main SBS medium.

Previously, as disclosed in U.S. Statutory Invention Registration H 1,791, a long length of fiber (generally 25 km or greater) is used to sustain the SBS at common levels of optical power, generally below 10 mW for the frequency components attenuated. It would be desirable to either reduce the amount of optical power required and/or to shorten the length of the SBS medium 207 to thereby improve the system's signal-to-noise ratio. The use of shorter fibers in the SBS medium 207 would have reduced passive losses as compared to longer fibers required by the teaching of the prior art. Further, the use of shorter fibers for the SBS medium also has the advantage of reducing the four-wave mixing of multiple signal frequencies contained in the signal. Such four-wave mixing generated signals can create spurious noise in a long SBS fiber medium.

SUMMARY OF THE INVENTION

Compared to the prior art, the disclosed system and method taps off a portion of the input signal and diverts it to a separate SBS medium to create a seed for SBS that is injected into the main fiber in the reverse direction which allows the length of that SBS medium to be dramatically shortened. In one embodiment of the disclosed system and method, the separate SBS medium comprises at least one recirculating loop and optical amplification is added to the at least one recirculating loop to further reduce the threshold for limiting. Further, if the frequency of the RF signal to be limited is known, yet another embodiment of the disclosed system and method modulates the tapped off signal with a RF signal having the frequency to be limited before that RF lightwave signal is supplied to the recirculating loop, which seeds the SBS limiter for that particular sideband frequency.

Additionally, the disclosed system and method utilizes a RF-lightwave approach to selectively attenuate certain modulation sidebands and not to attenuate other modulation sidebands.

In one aspect the present invention provides a limiter having a transmitter producing an output signal having at least two frequency components; a signal divider for dividing said output signal into a first divided signal and a second divided signal; a first SBS medium for receiving said first divided signal; and a second SBS medium, said second SBS medium generating Stokes light in response to said second divided signal, said second SBS medium being coupled to the first SBS medium for providing said Stokes light thereto.

In another aspect the present invention provides a method for selectively attenuating frequency components, the method including (i) modulating an RF signal onto a lightwave carrier creating a RF-modulated lightwave signal, the RF-modulated lightwave signal having at least two frequency components; (ii) dividing the RF-modulated lightwave signal into a first lightwave signal and a second lightwave signal; (iii) propagating the first lightwave signal into a first SBS medium; (iv) generating a set of Stokes waves from said second lightwave signal; and (v) seeding the first SBS medium with the set of Stokes waves. This technique permits the use of a threshold for the first SBS medium to be set lower than the threshold would have been set without the seed.

DESCRIPTION OF THE DRAWINGS

FIG. 1b depicts an output spectrum out of a limiter based upon the input spectrum given in FIG. 1a;

FIG. 3b depicts an output spectrum corresponding to the input spectrum of FIG. 3a;

FIG. 3c depicts a Stokes reflection from a SBS medium corresponding to an input spectrum shown in FIG. 3a;

DETAILED DESCRIPTION

Figure 1A:
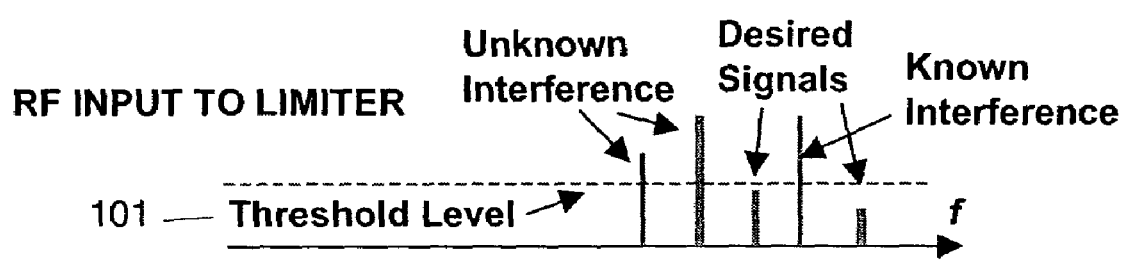
FIG. 1a depicts an input spectrum into a limiter.
Figure 1B:

The limiter system and method disclosed may suppress, in a self-adaptive manner, much of the unwanted RF interference without needing a priori knowledge of the frequencies of those interfering signals. This approach makes beneficial use of Simulated Brillouin Scattering (SBS) in optical fibers to reduce the power of the undesired signals. The effect of SBS is essentially to limit the output power at all frequencies such that the output power at all frequencies falls below a given threshold level 101, as illustrated in FIGS. 1a and 1b. The spontaneous-gain bandwidth for Brillouin scattering is approximately 50–100 MHz. One skilled in the art will appreciate this gain bandwidth determines the frequency resolution of the system and method disclosed herein. Thus, any interfering signal that is spaced more than 50 MHz away from the desired signal can be reduced without also reducing the intensity of the desired signal. The threshold level for SBS depends on the length of the optical fiber, but is not dependent on the exact frequency, f. Thus, unlike the conventional notch filters used for interference suppression, a SBS-based limiter does not need prior knowledge of the frequencies of the interfering signals. Furthermore, as will be further discussed below, any known interfering signals can be suppressed to an even lower level by injecting light modulated at the Stokes-shifted replicas of those signals in the reverse direction through the fiber.

As discussed above, the disclosed system and method exploits the narrow-band power limiting action of SBS to suppress strong interfering signals while not affecting the desired low power and/or wide bandwidth received signal. This approach to limiting self-picks the frequencies attenuated, and affects only a narrow band of frequencies (<50 MHz) at each attenuation notch. The disclosed system and method reduces the length of the optical fiber needed to achieve the limiting, thereby reducing the attenuation and distortion of the desired signal components, which do not undergo limiting. Preferred implementations of the disclosed system and method for limiting are discussed below starting with FIG. 4. Before discussing the preferred embodiments of the invention, the prior art represented by U.S. Statutory Invention Registration H 1,791 will first be discussed in greater detail.

Figure 2:
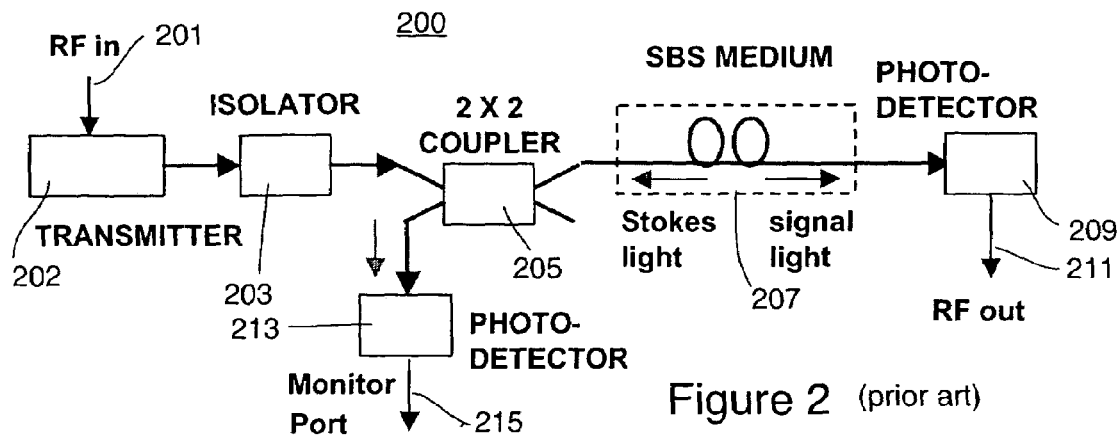
FIG. 2 depicts the basic elements of a limiter based on a prior art construction.

FIG. 2 depicts the basic elements of a frequency selective limiter that is based on a construction disclosed in U.S. Statutory Invention Registration H 1,791. The attenuator/filter 200 of FIG. 2 has a RF input 201 and a RF output 211. The attenuator/filter 200 includes a photonic transmitter 202, an optical isolator 203, a 2×2 coupler 205, a length of optical fiber 207 in which SBS occurs (also referred to herein as a SBS medium) and a photodetector 209. Generally, the RF signal at input 201 contains a number of frequency components. The input 201 is applied to the photonic transmitter 202, which modulates the RF signal at input 201 onto a lightwave carrier, thereby creating a RF-lightwave signal. The length of optical fiber in the SBS medium 207 performs the limiting function. The optical isolator 203 prevents the backward-propagating light created by SBS (i.e., the Stokes light) from interfering with the operation of the photonic transmitter 202. The photodetector 209 converts the limited RF-lightwave signal back into a RF signal, which is available at the output of the photodetector 211. The 2×2 optical coupler 205 is placed between the transmitter 202 and the SBS medium 207 to provide a tap for the backward-propagating light. Thus, the frequency components that experience limiting can be monitored and measured using a second photodetector 213. The output of the second photodetector 213, herein referred to as monitor port 215, provides a means to determine the frequencies and strengths of the interfering signals.

Stimulated Brillouin scattering (SBS) has been studied extensively since 1964 and in fibers especially since mid-1970s. For more information on SBS the reader may wish to review the book *Nonlinear Fiber Optics*, Academic Press, 1995, by G. P. Agrawal. SBS manifests itself through coupling the energy of a "pump" beam to a backward propagating "Stokes" beam which is down shifted in frequency with respect to the pump beam by $v_B=2v_s/(c/n)v_p$ ($v_B$ is about 10.5 GHz for 1.55 µm light), where $v_s$, and $(c/n)$ are the speeds of the sound and light in the fiber, and $v_p$ is the optical frequency of the pump beam. For small signals, the growth of the Stokes beam can be described by an exponential relation, $\exp[g(v) (P_p/A_c)L_{eff}]$. Here $g(v)$ is the gain coefficient, $P_p$ is the pump power, $A_c$ is the effective core area of the fiber and $L_{eff}$ is the effective fiber length. $L_{eff}$ equals $[1-\exp(-\alpha L)]/\alpha$, where L is the fiber length and $\alpha$ is the absorption coefficient. Generally, $g(v)$ has a Lorentzian line shape with a peak at $v_s=v_p-v_B$, and bandwidth $\Delta v_B$. Typically, $\Delta v_B$ is about 30–50 MHz for silica fibers at 1.55 µm but it can be broader if there are inhomogeneities in the fiber due to manufacturing, temperature or stress variations along the fiber. Since the intrinsic SBS linewidth in the fiber, $\Delta v_B$, is <50 MHz, SBS is most easily observed with narrowband pumps. Typically, $g(v_s)$ has a value of about $5\times10^{-11}$ cm/W for pure silica fibers and it is wavelength independent. Given these typical values in the fiber, spontaneous SBS has been observed with only 5 mW of input power, $P_{thres}$, at 1320 nm wavelength in 13.6 km long fibers, when $g_0L_{eff}(=g(v) (P_{thres}/A_c)L_{eff})$ reaches a value of 15–30 as described in a paper by D. Cotter, *Electronics Letters*, 1982, vol. 17, p. 379. For input powers higher than the SBS threshold pump power $P_{thres}$ the transmitted power is clamped to approximately one or two times $(P_{thres}) \exp(-\alpha L)$ and the excess power, $(P_P-P_{thres})$, is converted into a strong Stokes beam propagating in the backward direction. The effective bandwidth of the interaction also is reduced, to $\Delta v_B/(g_0L_{eff})^{1/2}$, due to exponential gain in the stimulated scattering process.

Figure 3A:
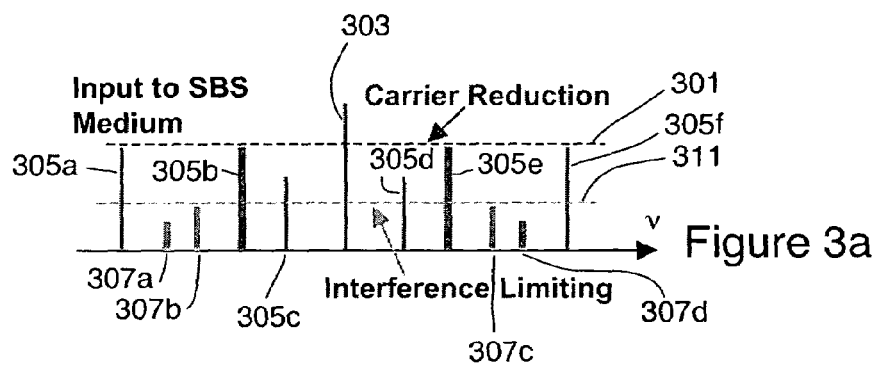
FIG. 3a depicts a second input spectrum into a limiter.

FIG. 3a depicts the spectrum at the input to the SBS medium 207. In U.S. Statutory Invention Registration No. H 1,791, the threshold for the attenuator/filter 200 of FIG. 2 is typically set to attenuate the optical carrier 303 of FIG. 3a, and thereby increases the depth of optical modulation of the RF-lightwave signal. The optical carrier 303 typically has much higher optical power than the modulation sidebands 307a–d. This setting is indicated by the upper dashed line 301 of FIG. 3a.

Figure 3B:
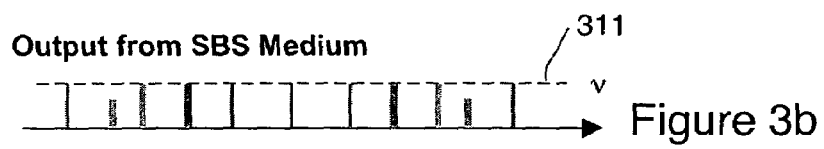
Figure 3C:
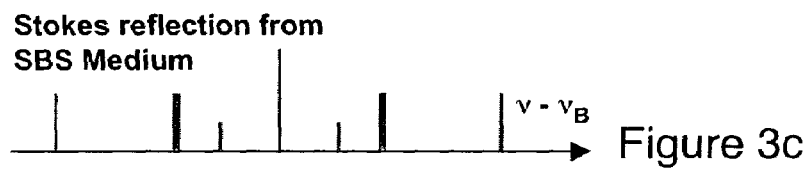

The prior art attenuator/filter 200 of FIG. 2 can be used in a different manner than that described in U.S. Statutory Invention Registration No. H 1,791. The attenuator/filter 200 can be used to selectively limit the intensities of strong RF components 305a–f, i.e. the undesired interference signals, which can be observed in the spectrum of FIG. 3a as features or peaks in the modulation sidebands. The strong interference peaks 305a–f can be selectively limited by setting the threshold for SBS just above the intensities of the desired signal peaks 307b, 307c, so that those desired features are affected only minimally by SBS. This may be accomplished by increasing the length of the optical fiber in the SBS medium 207 or by increasing the optical power of the transmitter 202. The new setting is indicated by the lower dashed line 311 in FIG. 3a. FIG. 3b illustrates the output from the SBS medium 207 where all of the signals have been limited to the level indicated by line 311. FIG. 3c illustrates the Stokes light observed from the 2×2 coupler 205 tap when the threshold of the attenuator/filter 200 is set to the lower dashed line 311 of FIG. 3a.

This approach has several weaknesses, however. First, the optical carrier is attenuated by the SBS process. Since SBS is derived from noise, the attenuated optical carrier is more noisy. This noise is transferred to the desired RF signal components produced by photodetector 209. Second, a long length of the fiber 207 or high optical intensity from the transmitter 202 is needed for selective limiting to occur.

Figure 4:
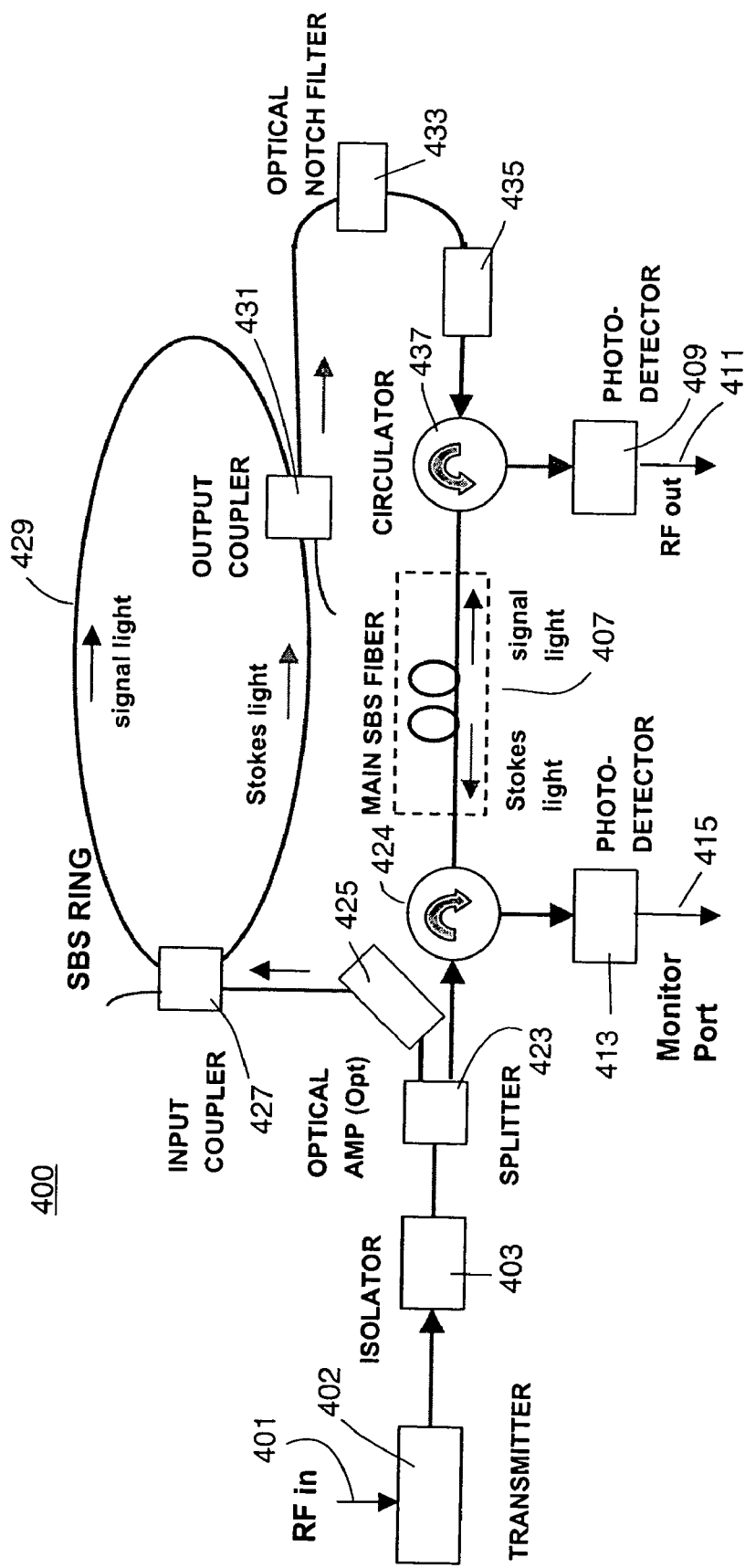
FIG. 4 depicts a limiter including two SBS mediums.

FIG. 4 illustrates an embodiment of a self-adapting limiter in accordance with the present invention. The signal output from a photonic transmitter 402 is a RF modulated lightwave signal that contains a number of modulation sidebands as well as the optical carrier. This signal is passed through an isolator 403, a splitter 423, and an optional optical circulator 424 and then into a SBS medium 407 wherein SBS limits the transmitted power at the frequencies of the strong, co-site interference $v_I$ or jamming $v_J$ signals. Only the light power in a narrow band ($<\Delta v_B$) of frequencies around $v_p=v_O, v_I, v_J$ are affected. SBS thresholds at a 1550 nm wavelength have been measured for several common types of optical fiber as discussed in a paper by C. C. Lee and S. Chi, *IEEE Photonics Technology Letters,* 2000, vol. 12, no. 6, p. 672. Thresholds for spontaneous (unseeded) SBS are between 5–10 mW for 25 km lengths of fiber. A coupler may be used in lieu of the splitter 423 and circulator 424.

As shown in FIG. 4, in addition to the SBS medium 407, a second SBS medium 429 is utilized in this embodiment. In this embodiment, the second SBS medium 429 takes the form of an SBS ring. One skilled in the art will appreciate that there are other SBS media known in the art that can be used and that SBS medium may comprise one or more loops or fiber strands, as will be discussed later in reference to FIGS. 5 and 8. As the RF-modulated lightwave 401 is passed through splitter 423, a portion of the RF-modulated lightwave is directed toward the SBS ring 429, while the remaining portion of the RF-modulated lightwave continues toward the SBS medium 407. A portion of the RF-modulated lightwave passes through an optional optical amplifier 425 and is then coupled into the SBS ring 429 by an input coupler 427. The RF-lightwave circulates in the SBS ring 429 and Stokes light is generated. The generated Stokes light leaves the SBS ring 429 through an output coupler 431. The Stokes light from ring 429 then passes through a desirable optical notch filter 433 and an optional optical amplifier 435 before entering into a second optical circulator 437, where the Stokes light from ring 429 enters the SBS medium 407.

The addition of the SBS ring 429 allows the power of transmitter 402 to be reduced and/or allows the fiber length of the SBS medium 407 to be reduced. With this approach, a fraction of the input signal 401 (typically, 0.1–1.0 mW) is fed into the SBS ring 429 using splitter 423. The SBS ring 429 may contain a single loop as depicted in FIG. 4. The SBS ring 429 recirculates both the input light from the splitter 423 and the generated Stokes shifted light, at frequency $v_s$, produced by SBS in the SBS ring 429. The threshold pump power for SBS oscillations is reduced in the SBS ring 429 because of this recirculation. The threshold in the SBS ring 429 is preferably set so that only the components $v_p=v_O$, $v_I$, $v_J$ produce appreciable Stokes shifted energy. A portion of the Stokes shifted light from the ring is tapped off by the output coupler 431 and is fed into the distal end of the main SBS medium 407 such that it counter-propagates to the signal carrying light. In the SBS fiber medium 407, the Brillouin amplification of this light at $v_s$ depletes only the components at $v_p$. This results in a Stokes seed for the SBS effect in the SBS medium 407. For example, with a seed energy of 0.1–1.0 mW, a much smaller SBS gain, $g_0 L_{eff} \ll 10$, is sufficient to reach a depletion regime of operation. Thus, a more practical length (~100 to 1000 m) of SBS fiber may be used in the SBS medium 407 (as opposed to the 25 km lengths required by the prior art). A smaller length of SBS fiber provides the benefits of reducing the attenuation, from propagation loss, of the desired signal components and reducing spurious noise that can be generated by four-wave mixing of different signal frequencies.

A pair of optical couplers 427, 431 is used to couple light into and out of the SBS ring 429. For a high-Q SBS ring resonator 429, each of sidebands associated with the interfering signal components should coincide with one of the resonance frequencies of the SBS ring 429. Since the interfering signals are generally unknown, this is generally not feasible. Thus, the SBS ring resonator 429 is designed to have a low external (loaded) Q. Therefore, the strengths of the input and output couplers 427, 431 are fairly high. One skilled in the art will appreciate that the external Q is determined primarily by the coupling strengths of the input and output couplers 427, 431 since the fiber attenuation is so small. The light makes only a few cycles through the SBS ring resonator 429. Thus, the SBS ring resonator 429 must be quite long in order for the SBS threshold to be sufficiently low. Therefore, with the addition of the SBS ring 429, the length of the main SBS medium 407 (which affects the signal-to-noise property of the desired signals) is reduced at the expense of adding a long length of fiber in the SBS ring 429 (which affects only the undesired interference).

The optional optical amplifiers 425, 435, can be located between the transmitter 402 and the SBS ring 429 or between the SBS ring 429 and the circulator 437 that feeds the Stokes seed into the main SBS medium 407. These amplifiers 425, 435, if utilized, further increase the strength of the Stokes seed and further reduce the SBS threshold level or the length needed of the main SBS medium 407. These amplifiers 425, 435 will increase the noise of the Stokes seed, and thus increase the noise of the undesired interference components, but they do not affect the noise of the desired signal components.

One or more notch filters 435 may be inserted between the output coupler 431 and the optical circulator 437, so that essentially no Stokes seed is generated for those desired frequency components. The optional notch filter 435 may be designed to remove the Stokes light associated with any one of the frequency components that is generating Stokes light. At least one notch filter 435 is preferably utilized to remove the Stokes light associated with the optical carrier. The removal of the Stokes light associated with the optical carrier prevents the optical carrier from being reduced. One skilled in the art will appreciate that the SBS process can add noise to those signal components that are attenuated by it. Thus, it is desirable to avoid having the SBS process affect the optical carrier, since added noise from the SBS process can otherwise degrade the signal to noise ratio of the desired RF signal components produced by photodetector 409.

Figure 5:
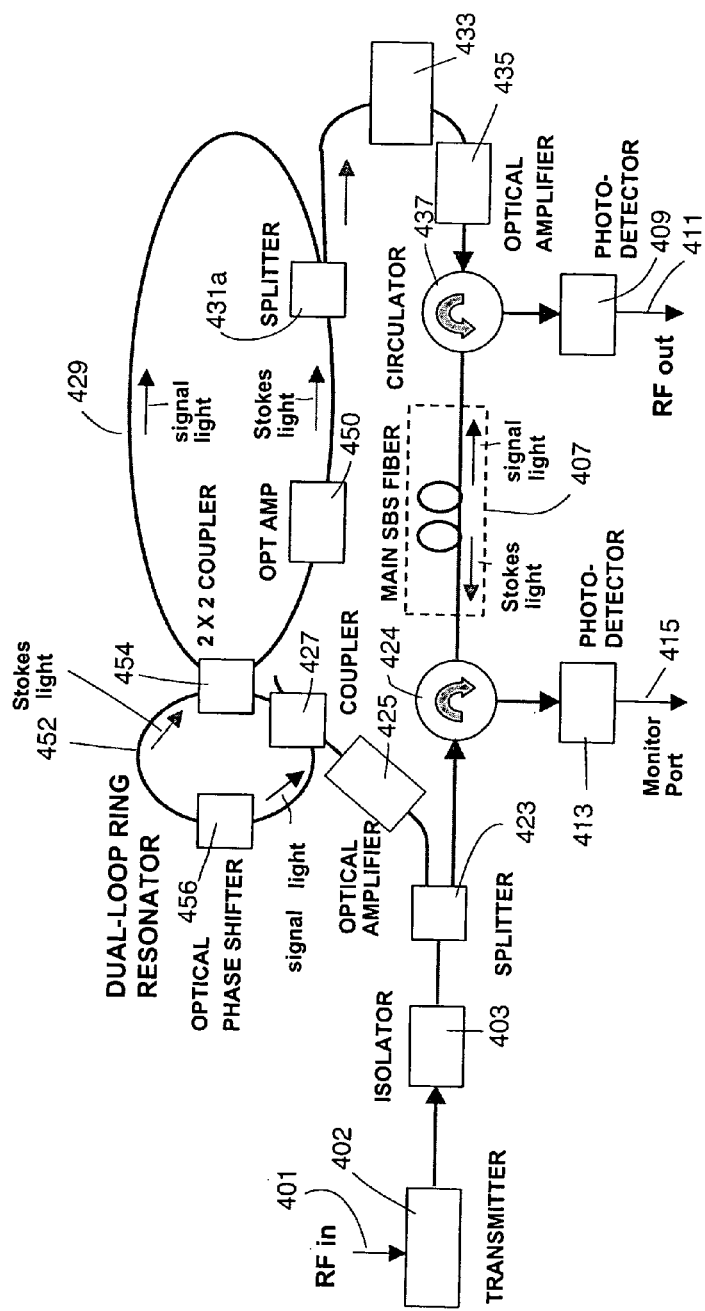
FIG. 5 depicts a limiter where one of the SBS mediums comprises two loops.

FIG. 5 depicts another embodiment in accordance with the present invention. Elements previously described in relation to FIG. 4 that are the same as those in FIG. 5 are labeled with the same numerical numbers and function essentially as previously described. In this embodiment, an amplifier 450 is preferably included in the SBS ring 429. Amplifier 450 amplifies both the tapped signal light and the Stokes shifted energy, produced from the components of the input signal at $v_p=v_O$, $v_I$, $v_J$. The intended effect of amplifier 450 is to further increase the strength of the Stokes seed and further reduce the SBS threshold level or the length needed of the main SBS medium 407. Amplifier 450 will increase the noise of the Stokes seed, and thus increase the noise of the undesired interference components, but the amplifier 450 does not affect the noise of the desired signal components.

The embodiment of FIG. 5 illustrates several other possible embodiments of the invention. For example, the output coupler 431 of FIG. 4 may be replaced by a splitter 431*a* of FIG. 5. Light is coupled out of the ring 429 through the splitter 431*a* essentially regardless of its frequency.

Another possible modification illustrated in FIG. 5 is the addition of a second ring 452 coupled to the SBS ring 429 by a 2×2 coupler 454. This modification results in a SBS dual-loop ring resonator comprising two coupled loops of optical fiber 452, 429 that trace a figure-eight path. The SBS dual-loop ring resonator provides enhanced functionality over the single loop SBS ring 429 of FIG. 4. In some applications, the interference components cover a small range of frequencies (substantially less than 10 GHz). It may be desirable to tune the coupled loops 429, 452 to achieve a resonator resonance spectrum that contains peaks primarily at frequencies of the interference components and their Stokes-shifted light. An optional phase shifter 456 in the first loop 452 ensures that the light in the first loop 452 is in phase with the light from the transmitter 402 that is injected into the dual-loop ring resonator at the splitter 423. The optional phase shifter 456 accommodates constructions tolerances and thus the added phase shift is adjusted as needed.

Figure 6:
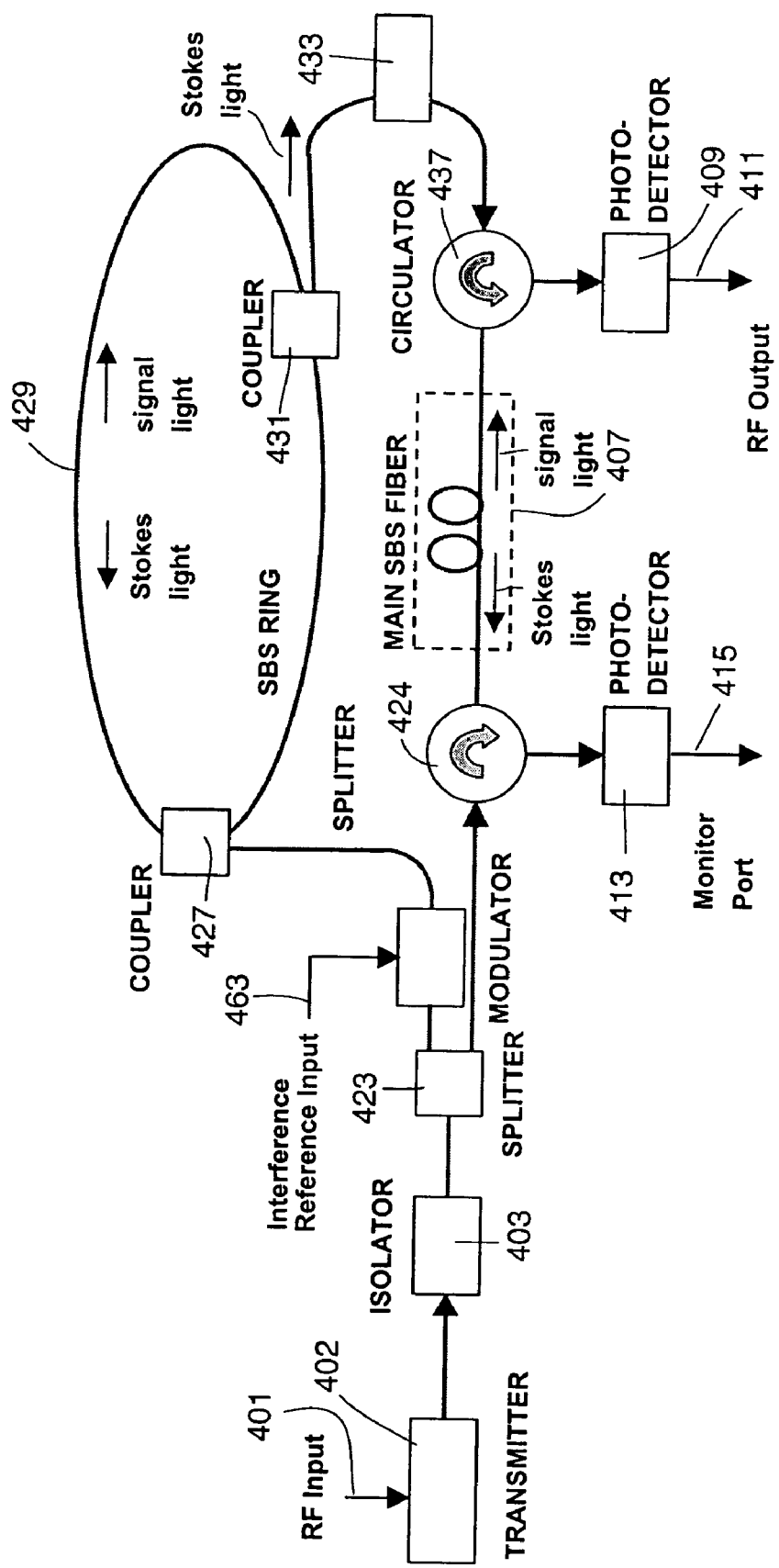
FIG. 6 depicts a limiter including two SBS mediums and a modulator for a reference input.

FIG. 6 illustrates another embodiment of the invention. In this embodiment a modulator 465 has been added to the system between the splitter 423 and the coupler 427 for SBS ring 429. If the frequency, $v_K$, of an interfering signal is known a priori, a reference signal 463 at that frequency can be injected into the SBS ring resonator by means of the modulator 465. The reference signal 463 is modulated onto the RF-lightwave signal diverted into the SBS ring 429. The modulator 465 is placed before the SBS ring 429 and adds $v_K$ to the frequencies that produce the Stokes seed. Thus, the component of the input signal at $v_K$ also will be suppressed by the SBS in the SBS medium 407. One skilled in the art will appreciate that the frequency of the reference signal 463 does not have to be exactly the same as the frequency of the interfering signal to be attenuated. The frequency of the reference signal 463 only has to be separated from the interfering signal by an amount substantially less than the SBS gain bandwidth.

Figure 7A:
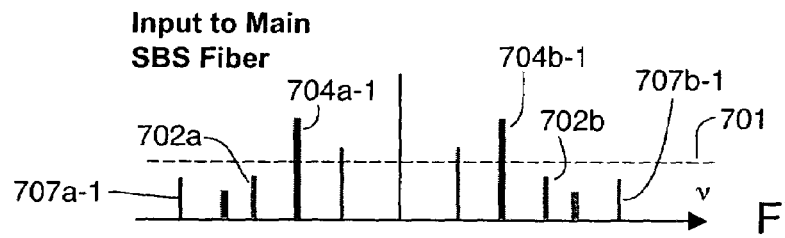
FIG. 7a depicts a third input spectrum.
Figure 7B:
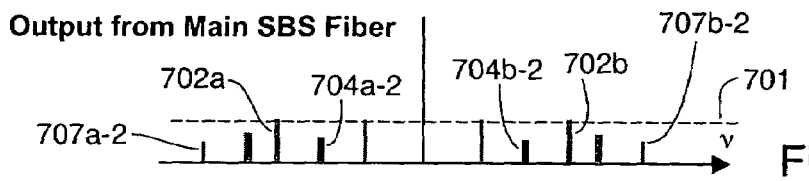
FIG. 7b depicts an output spectrum after the input spectrum of FIG. 7a has been sent through the system of FIG. 6.
Figure 7C:
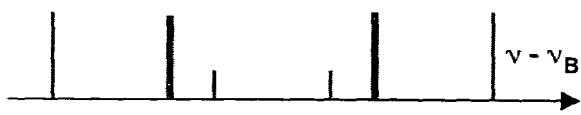
FIG. 7c depicts the Stokes reflection from the Main SBS medium after the input spectrum of FIG. 7a has been sent through the system of FIG. 6.

FIG. 7*a* depicts the input spectrum at the input to the transmitter 402 along with a line 701 indicating where the SBS threshold is set for the limiter of FIG. 6. The spectrum includes known strong interfering signals 704*a*-1, 704*b*-1, known weak interfering signals 707*a*-1, 707*b*-1 and desired signals 702*a*, 702*b*. As discussed above, the reference signal 463 is supplied separately from the RF input signal 401, therefore, the frequency component of the known strong interfering signals 704*a*-1, 704*b*-1 and the known weak interfering signals 707*a*-1, 707*b*-1 can be made even weaker, at the RF output 411, than the level set by the SBS threshold 701. FIG. 7*b* depicts the output spectrum at the RF output 411. As illustrated in FIG. 7*b*, the frequency component at the RF output 411 of the known strong interfering signals indicated by reference 704*a*-2, 704*b*-2 and the frequency component of the known weak interfering signals indicated by reference 707*a*-2, 707*b*-2 are attenuated such that they are below reference line 701 and desired signals 702*a*, 702*b*.

Figure 8A:
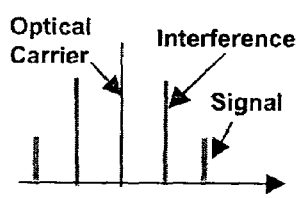
FIGS. 8a–8d depict an input spectrum, a carrier-suppressed spectrum, and a monitor-port spectrum, and an output spectrum, respectively, taken at several points in the embodiment of FIG. 8.
Figure 8B:
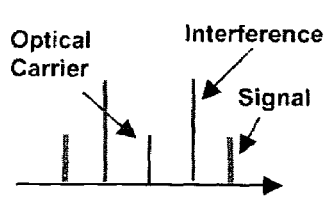
Figure 8C:
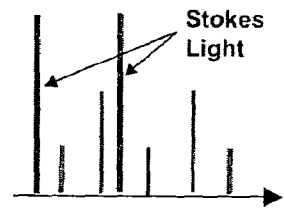
Figure 8D:
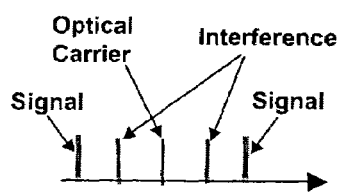
Figure 8:
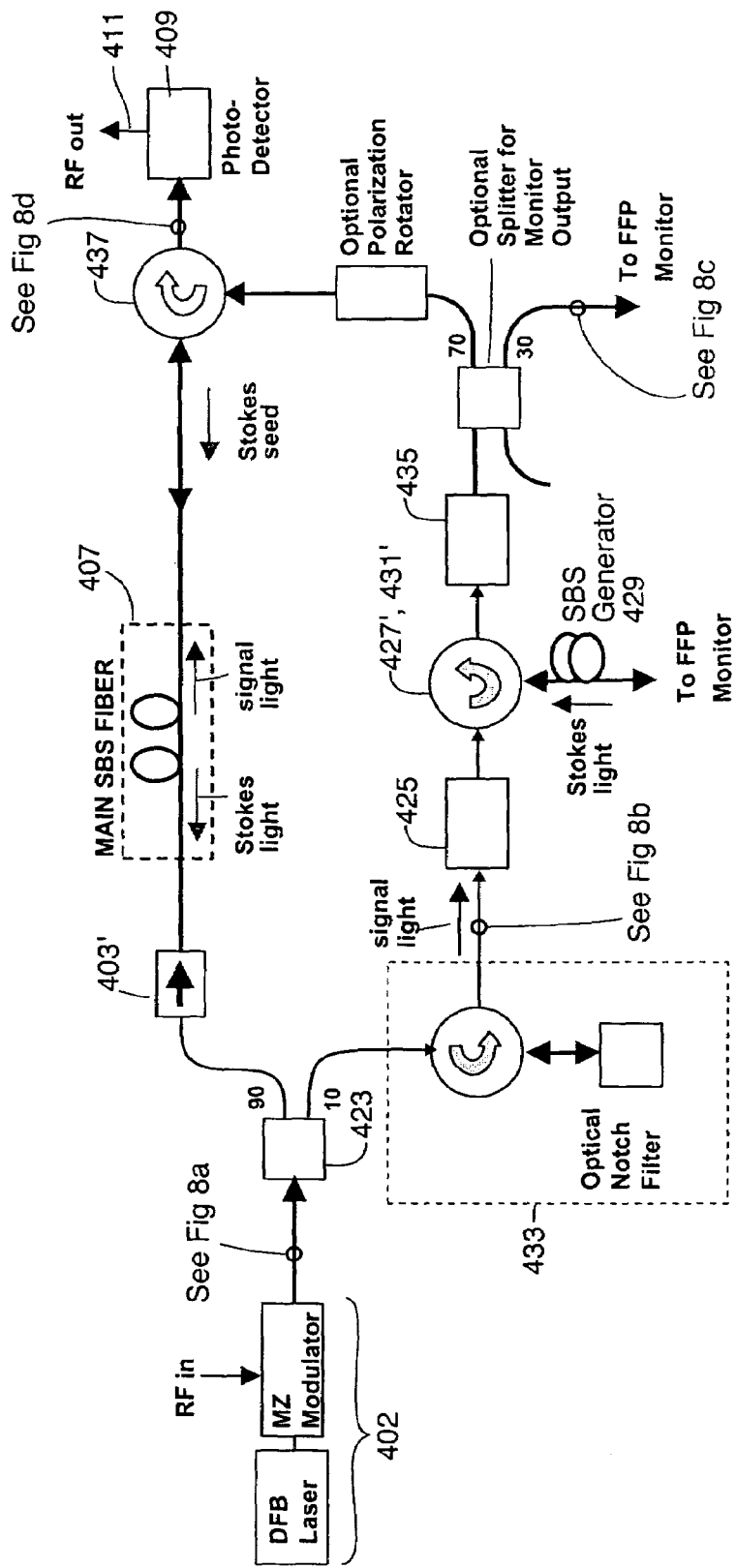
FIG. 8 depicts another limiter including two SBS mediums.

FIG. 8 depicts another embodiment including two SBS mediums. In this embodiment, the second SBS medium 429 comprises a strand of fiber the remote end of which has a non-reflective termination that may be utilized for monitoring purposes, if desired. Since the second SBS medium has only one end (a proximate end) that is coupled to the circuit, a single circulator (labeled 427', 431') replaces couplers 427, 431 and splitter 431*a* described with reference to the prior embodiments. In this embodiment, the notch filter 433 is moved closer to splitter 423 and in front of the second SBS medium 429 making the optical amplifier 425 more efficient since the optical carrier is not also being amplified in this embodiment. The isolator 403 is moved downstream of the splitter. An optional polarization rotator may be utilized if the other components coupled directly or indirectly to the second SBS media are not polarization maintaining. Otherwise the optical circuit of FIG. 8 is similar to the previously discussed embodiments and since common reference numerals are used to identify the same or similarly functionally components in the several embodiments, the remaining components shown in FIG. 8 should not require further explanation for those skilled in the art in view of the prior explanations which have been provided.

The main SBS medium 407 is not expected to have much effect on the desired frequency components of the input signal, if those components are separated from the filtered components by more than the SBS bandwidth. The effect on the desired signal components is similar to the effect of propagating a weak optical signal in a long length of fiber. Thus, the SBS limiters of FIGS. 4–8 respectively are expected to have high linearity. However, one must consider the interaction between the various strong, unwanted frequency components, that may arise because of other non-linear effects (e.g., four-wave mixing) occurring in the optical fiber. The potential exists for that interaction to create spurs within the bandwidths of the desired signal components. One skilled in the art will appreciate that the Stokes signal is strongest in the portion of the main SBS medium 407 that is closest to the photonic transmitter 402. Thus, the unwanted components are attenuated quickly by SBS and their optical intensity is close to the limited value over much of the length of the SBS medium 407. This effect should reduce the contribution from these other fiber non-linearities.

Having described the invention in connection with a preferred embodiment therefore, modification will now certainly suggest itself to those skilled in the art. As such, the invention is not to be limited to the disclosed embodiments except as required by the appended claims.

The invention claimed is:

1. A limiter comprising: a transmitter producing an output signal having at least two frequency components; a signal divider for dividing said output signal into a first divided signal and a second divided signal; a first stimulated Brillouin scattering medium for receiving said first divided signal; and a second stimulated Brillouin scattering medium, said second stimulated Brillouin scattering medium generating Stokes light in response to said second divided signal, said second stimulated Brillouin scattering medium being coupled to the first stimulated Brillouin scattering medium for providing said Stokes light thereto.

2. The limiter of claim 1 wherein the stokes light coupled to the first stimulated Brillouin scattering medium propagates in a reverse direction compared to said first divided signal received by the first stimulated Brillouin scattering medium.

3. The limiter of claim 2 further comprising an optical notch filter, wherein said Stokes light generated by said second stimulated Brillouin scattering medium passes through said optical notch filter before being provided to said first stimulated Brillouin scattering medium, said Stokes light comprises a Stokes wave corresponding to an at least one of the at least two frequency components, said optical notch filter removing said Stokes wave corresponding to said at least one of the at least two frequency components before passing said Stokes light from said second stimulated Brillouin scattering medium to said first stimulated Brillouin scattering medium.

4. The limiter of claim 3 wherein the at least one of the at least two frequency components comprises Stokes light associated with an optical carrier of the transmitter.

5. The limiter of claim 4 wherein the optical notch filter block Stokes light associated with said optical carrier.

6. The limiter of claim 1 further comprising a first optical amplifier for amplifying said second divided signal.

7. The limiter of claim 6 further comprising a second optical amplifier for amplifying said Stokes light from said second stimulated Brillouin scattering medium.

8. The limiter of claim 7 further comprising a third optical amplifier for amplifying said Stokes light within said second stimulated Brillouin scattering medium.

9. The limiter of claim 1 wherein said second stimulated Brillouin scattering medium comprises one or more optical loops.

10. The limiter of claim 1 wherein said second stimulated Brillouin scattering medium comprises a strand of optical fiber having a non-reflective distal end, said distal end being optically isolated from other elements of said limiter.

11. The limiter of claim 1 further comprising a modulator for modulating said second divided signal with a reference input before said second stimulated Brillouin scattering medium receives said second divided signal.

12. The limiter of claim 11 wherein said reference input is associated with at least one of the at least two frequency components.

13. The limiter of claim 1 further including an optical notch filter and wherein the second divided signal passes through said optical notch filter before being coupled to said second stimulated Brillouin scattering medium.

14. The limiter of claim 13 wherein the at least one of the at least two frequency components comprises Stokes light associated with an optical carrier of the transmitter.

15. The limiter of claim 14 wherein the optical notch filter block Stokes light associated with said optical carrier.

16. A method for selectively attenuating frequency components comprising the steps of: modulating an RF signal onto a lightwave carrier creating a RF-modulated lightwave signal, said RF-modulated lightwave signal having at least two frequency components; dividing said RF-modulated lightwave signal into a first lightwave signal and a second lightwave signal; propagating said first lightwave signal into a first stimulated Brillouin scattering medium; generating a set of Stokes waves from said second lightwave signal; and seeding said first stimulated Brillouin scattering medium with said set of Stokes waves, whereby a threshold for said stimulated Brillouin scattering medium may be set lower than the threshold would be set without said seed.

17. The method of claim 16 further comprising removing at least one frequency component from said second lightwave signal before said set of Stokes waves is generated from said second lightwave signal.

18. The method of claim 17 wherein said at least one frequency component comprises an optical carrier.

19. The method of claim 16 wherein said set of Stokes waves contains a first Stokes wave corresponding to at least one of said at least two frequency components, said method further comprising the step of removing said first Stokes wave from said set of Stokes waves before seeding said first stimulated Brillouin scattering medium.

20. The method of claim 19 wherein at least one of said at least two frequency components comprises an optical carrier and wherein the first Stokes wave is removed before seeding said first stimulated Brillouin scattering medium.

21. The method of claim 16 further comprising the step of amplifying said second lightwave signal.

22. The method of claim 16 further comprising the step of amplifying said set of Stokes waves.

23. The method of claim 16 wherein the step of generating the set of Stokes waves further comprises recirculating said second lightwave signal in one or more loops of a SBS medium.

24. The method of claim 16 wherein the step of generating the set of Stokes waves further comprises propagating said second lightwave signal in a strand of optical fiber having a non-reflective distal end, said distal end being optically isolated from other elements of said limiter.

25. The method of claim 16 further comprising the step of modulating said second divided signal with a reference input before generating said set of Stokes waves.

26. The method of claim 25 wherein said reference input is associated with at least one of the at least two frequency components.

27. A filter for selectively attenuating frequency components of a signal, the filter comprising: a modulator for modulating the signal onto a lightwave carrier creating a RF-modulated lightwave signal, said RF-modulated lightwave signal having at least two frequency components; a splitter device for dividing said RF-modulated lightwave signal into a first lightwave signal and a second lightwave signal; a first stimulated Brillouin scattering medium coupled to receive the first lightwave signal; means for generating a set of Stokes waves from said second lightwave signal; and means for seeding the first stimulated Brillouin scattering medium with the set of Stokes waves.

* * * * *